(12) United States Patent
Kulkarni et al.

(10) Patent No.: US 10,831,603 B2
(45) Date of Patent: Nov. 10, 2020

(54) REBUILD ASSIST USING FAILED STORAGE DEVICE

(71) Applicant: Western Digital Technologies, Inc., San Jose, CA (US)

(72) Inventors: Anand Kulkarni, San Jose, CA (US); Vladislav Bolkhovitin, San Jose, CA (US); Brian Walter O'Krafka, Austin, TX (US); Sanjay Subbarao, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 161 days.

(21) Appl. No.: 16/054,972

(22) Filed: Aug. 3, 2018

(65) Prior Publication Data

US 2020/0042389 A1  Feb. 6, 2020

(51) Int. Cl.
*G06F 11/00* (2006.01)
*G06F 11/10* (2006.01)
(Continued)

(52) U.S. Cl.
CPC ........ *G06F 11/1092* (2013.01); *G06F 3/0605* (2013.01); *G06F 3/065* (2013.01);
(Continued)

(58) Field of Classification Search
CPC .... G06F 11/2094; G06F 3/067; G06F 3/0689; G06F 11/1088; G06F 11/1092; G06F 11/108
See application file for complete search history.

(56) References Cited

U.S. PATENT DOCUMENTS 5,388,083 A   2/1995  Assar et al.
5,530,948 A   6/1996  Islam
(Continued)

FOREIGN PATENT DOCUMENTS

EP   2626780 B1    11/2019
WO   2014110095 A1   7/2014
WO   2015116197 A1   8/2015

OTHER PUBLICATIONS

International Search Report and Written Opinion of Internationals Application No. PCT/US2018/062498, dated Mar. 12, 2019, 20 pages.
(Continued)

*Primary Examiner* — Charles Ehne
(74) *Attorney, Agent, or Firm* — Patent Law Works LLP (57) ABSTRACT

Methods, systems, and other aspects for reconstructing data and rebuilding a failed storage device in a storage system using one or more functioning compute resources and/or storage resources of the failed storage device. For example, a method may include, responsive to a detection of a failed storage device in a storage system, locating data and redundancy information in functioning storage device(s) in the storage system for reconstructing data of the failed storage device; issuing peer-to-peer commands to the functioning storage device(s) to obtain the data and the redundancy information from the functioning storage device(s); and reconstructing the data of the failed storage device based on the data and the redundancy information obtained from the functioning storage device(s), wherein a functioning compute resource of the failed computing device at least partially performs one or more of the locating, issuing, and reconstructing.

20 Claims, 8 Drawing Sheets

(51) Int. Cl.
*G06F 11/20* (2006.01)
*G06F 11/14* (2006.01)
*G06F 3/06* (2006.01)

(52) U.S. Cl.
CPC ............ *G06F 3/067* (2013.01); *G06F 3/0659* (2013.01); *G06F 3/0689* (2013.01); *G06F 11/1088* (2013.01); *G06F 11/142* (2013.01); *G06F 11/1451* (2013.01); *G06F 11/2094* (2013.01)

(56) References Cited

U.S. PATENT DOCUMENTS

| | | | |
|---|---|---|---|
| 5,680,539 | A | 10/1997 | Jones |
| 5,742,752 | A | 4/1998 | DeKoning |
| 6,092,215 | A * | 7/2000 | Hodges ............... G06F 11/1076 711/114 |
| 6,738,937 | B1 | 5/2004 | Bergsten |
| 7,293,133 | B1 | 11/2007 | Colgrove et al. |
| 7,434,107 | B2 | 10/2008 | Marks |
| 7,454,655 | B2 | 11/2008 | Werner et al. |
| 7,571,344 | B2 | 8/2009 | Hughes et al. |
| 7,596,570 | B1 | 9/2009 | Emigh et al. |
| 7,620,841 | B2 | 11/2009 | Chen et al. |
| 7,680,837 | B2 | 3/2010 | Yamato |
| 7,783,600 | B1 | 8/2010 | Spertus et al. |
| 7,934,055 | B2 | 4/2011 | Flynn et al. |
| 7,984,328 | B1 | 7/2011 | Coatney |
| 8,086,911 | B1 | 12/2011 | Taylor |
| 8,289,641 | B1 | 10/2012 | Emami |
| 8,473,648 | B2 | 6/2013 | Chakhaiyar et al. |
| 8,583,853 | B1 | 11/2013 | Lee et al. |
| 8,838,931 | B1 | 9/2014 | Marshak et al. |
| 8,904,261 | B2 | 12/2014 | Cideciyan et al. |
| 9,116,624 | B2 | 8/2015 | Canepa et al. |
| 9,118,698 | B1 | 8/2015 | Radovanovic |
| 9,122,587 | B2 | 9/2015 | Baryudin et al. |
| 9,262,278 | B2 | 2/2016 | Ben Romdhane et al. |
| 9,448,924 | B2 | 3/2016 | Sundaram et al. |
| 9,417,821 | B2 | 8/2016 | Slaight et al. |
| 9,720,601 | B2 | 8/2017 | Gupta et al. |
| 9,785,480 | B2 | 10/2017 | Kamawat et al. |
| 9,894,141 | B2 | 2/2018 | Hesselink et al. |
| 9,971,515 | B2 | 5/2018 | Chang et al. |
| 10,042,721 | B2 | 8/2018 | Condict et al. |
| 10,241,722 | B1 | 3/2019 | Malwankar et al. |
| 10,289,507 | B1 * | 5/2019 | Malwankar ........... G06F 3/0635 |
| 10,379,948 | B2 | 8/2019 | O'Krafka et al. |
| 10,394,634 | B2 | 8/2019 | Reddy |
| 10,409,769 | B1 | 9/2019 | Malhotra et al. |
| 10,474,528 | B2 | 11/2019 | Bolkhovitin et al. |
| 2002/0162075 | A1 | 10/2002 | Talagala et al. |
| 2003/0135514 | A1 | 7/2003 | Patel et al. |
| 2005/0028048 | A1 | 2/2005 | New et al. |
| 2005/0080991 | A1 | 4/2005 | Keohane et al. |
| 2005/0114448 | A1 | 5/2005 | Skomra |
| 2005/0114726 | A1 * | 5/2005 | Ouchi ................. G06F 11/1076 714/5.1 |
| 2006/0031722 | A1 | 2/2006 | Kolvick et al. |
| 2006/0123142 | A1 | 6/2006 | Duncan et al. |
| 2007/0226413 | A1 | 9/2007 | Elliott et al. |
| 2007/0245082 | A1 | 10/2007 | Margolus et al. |
| 2008/0005382 | A1 | 1/2008 | Mimatsu |
| 2008/0034153 | A1 | 2/2008 | Lee et al. |
| 2008/0250057 | A1 | 10/2008 | Rothstein et al. |
| 2009/0070539 | A1 | 3/2009 | Haustein et al. |
| 2009/0132760 | A1 | 5/2009 | Flynn et al. |
| 2009/0150605 | A1 | 6/2009 | Flynn et al. |
| 2009/0307426 | A1 | 12/2009 | Galloway et al. |
| 2010/0251073 | A1 | 9/2010 | Stolowitz |
| 2010/0280998 | A1 | 11/2010 | Goebel et al. |
| 2011/0029711 | A1 | 2/2011 | Dhuse et al. |
| 2011/0055178 | A1 | 3/2011 | Mark |
| 2011/0093742 | A1 | 4/2011 | Shinozaki |
| 2012/0011200 | A1 | 1/2012 | Zhang et al. |
| 2012/0079317 | A1 | 3/2012 | Nelogal et al. |
| 2012/0179869 | A1 | 7/2012 | Flynn et al. |
| 2012/0284460 | A1 | 11/2012 | Guda |
| 2013/0073894 | A1 | 3/2013 | Xavier et al. |
| 2013/0179753 | A1 | 7/2013 | Flynn et al. |
| 2013/0339599 | A1 | 12/2013 | Sundrani |
| 2014/0012906 | A1 | 1/2014 | Teja et al. |
| 2014/0101369 | A1 | 4/2014 | Tomlin et al. |
| 2014/0181041 | A1 | 6/2014 | Whitehead et al. |
| 2014/0181575 | A1 | 6/2014 | Kalach et al. |
| 2014/0237298 | A1 | 8/2014 | Pe'er |
| 2014/0258598 | A1 | 9/2014 | Canepa et al. |
| 2014/0365719 | A1 | 12/2014 | Kuzmin et al. |
| 2014/0379671 | A1 | 12/2014 | Barrus et al. |
| 2015/0067244 | A1 | 3/2015 | Kruger |
| 2015/0205668 | A1 | 7/2015 | Sundaram et al. |
| 2016/0070652 | A1 | 3/2016 | Sundararaman et al. |
| 2016/0092309 | A1 | 3/2016 | Gao et al. |
| 2016/0234172 | A1 | 8/2016 | Agarwal et al. |
| 2016/0335208 | A1 | 11/2016 | Slaight et al. |
| 2016/0342476 | A1 | 11/2016 | Nazari et al. |
| 2017/0116074 | A1 | 4/2017 | Hayes et al. |
| 2017/0242744 | A1 | 8/2017 | Wang et al. |
| 2017/0269862 | A1 | 9/2017 | Agombar et al. |
| 2017/0270018 | A1 | 9/2017 | Xiao et al. |
| 2017/0286237 | A1 | 10/2017 | Condict et al. |
| 2017/0329542 | A1 | 11/2017 | Chou et al. |
| 2018/0018231 | A1 | 1/2018 | Okada et al. |
| 2018/0024964 | A1 | 1/2018 | Mao et al. |
| 2018/0032446 | A1 | 2/2018 | Amarendran et al. |
| 2018/0054217 | A1 | 2/2018 | Schwaderer |
| 2018/0101450 | A1 | 4/2018 | Park et al. |
| 2018/0137004 | A1 | 5/2018 | Gao et al. |
| 2018/0341548 | A1 | 11/2018 | Bolkhovitin et al. |
| 2018/0341606 | A1 | 11/2018 | Bolkhovitin et al. |
| 2018/0357019 | A1 | 12/2018 | Karr et al. |
| 2019/0102249 | A1 | 4/2019 | Bolkhovitin et al. |
| 2019/0102250 | A1 | 4/2019 | O'Krafka et al. |
| 2019/0243703 | A1 | 8/2019 | Rooney et al. |

OTHER PUBLICATIONS

International Search Report and Written Opinion of Internationals Application No. PCT/US2019/035085, dated Sep. 18, 2019, 8 pages.
International Search Report and Written Opinion of Internationals Application No. PCT/US2019/035087, dated Sep. 25, 2019, 11 pages.
International Search Report and Written Opinion of Internationals Application No. PCT/US2019/035088, dated Sep. 26, 2019, 10 pages.
Ahluwalia, G., United States, White Paper. Event Stream Processor as seen by SAP, An evolution of event driven architecture, pp. 1-11.
Bulk Delete. OpenStack Docs: OpenStack Security Guide, docs.openstack.org/ocata/user-guide/cli-swift-bulk-delete.html.
Using Oracle Cloud Infrastructure Object Storage Classic, Deleting Multiple Objects in a Single Operation, Mar. 28, 2018, https://docs.oracle.com/en/cloud/iaas/storage-cloud/cssto/deleting-multiple-objects-single-operation.html.
About the IBM Cloud Storage API. Sep. 28, 2018. https://console.bluemix.net/docs/services/cloud-object-storage/api-reference/about-api.html#about-the-ibm-cloud-object-storage-api.
Hightower, R., et al., Analytics with Apache Spark Tutorial Part 2: Spark SQL—DZone Big Data, Dzone.com, Nov. 3, 2015, dzone.com/articles/analytics-with-apache-spark-tutorial-part-2-spark.
Moatti, Yosef & Rom, et al., 2017, Too Big to Eat: Boosting Analytics Data Ingestion from Object Stores with Scoop, https://www.researchgate.net/.
Object Operations. Sep. 28, 2018, https://console.bluemix.net/docs/services/cloud-object-storage/api-reference/api-reference-objects.html#object-operations.
Zhang, Jiacheng, et al., ParaFS: A Log-Structured File System to Exploit the Internal Parallelism of Flahs Devices, USENIX Annual Technical Conference, Jun. 22-24, 2016, 15 pages.

(56) References Cited

OTHER PUBLICATIONS

Bates, S., "Donard: NVM Express for Peer-2-Peer between SSDs and other PCIe Devices," Storage Developer Conference, SNIA Santa Clara, 2015, 18 pages.

Chester, E., "Drobo creator announces Transporter, the private cloud storage solution," May 28, 2013, <https://www.bit-tech.net/news/transporter-private-cloud-storage-drobo-cre/1/>, 2 pages.

Hasan, R., et al., "A Survey of Peer-to-Peer Storage Techniques for Distributed File Systems," ITCC '05 Proceedings of the International Conference on Information Technology: Coding and Computing (ITCC'05)—vol. 02 Apr. 4, 2005, 9 pages.

Wikipedia, The Free Encyclopedia, "Key Code Qualifier," retrieved Jul. 10, 2018, <https://en.wikipedia.org/wiki/Key_Code_Qualifier>, 8 pages.

"SCSI Sense Key Error Guide," Sun Microsystems, Inc., Part No. 817-5918-10, Feb. 2004, Revision A, 16 pages.

Amvrosiadis et al., Practical Scrubbing: Getting to the bad sector at the right time, 2012, IEEE, 2012, pp. 1-12.

International Search Report and Written Opinion of Application No. PCT/US2019/035060, dated Sep. 16, 2019, 8 pages.

International Search Report and Written Opinion of Application No. PCT/US2019/063104, dated Jan. 23, 2020, 11 pages.

IP.com, Peer-to-Peer Hard Disk Drive, Apr. 24, 2006, IP.com, 2006, pp. 1-3.

Xiang, Liping, et al., Optimal Recovery of Single Disk Failure in RDP Code Storage Systems, Jun. 18, 2010, http://citeseerx.ist.psu.edu/viewdoc/download?doi=10.1.1.331.4168&rep=rep1&type=pdf.

International Search Report and Written Opinion of Internationals Application No. PCT/US2019/035060, dated Sep. 16, 2019, 8 pages.

* cited by examiner

REBUILD ASSIST USING FAILED STORAGE DEVICE

BACKGROUND

The present disclosure relates to storage systems. In a more particular example, the present disclosure relates to methods and systems for reconstructing data and rebuilding a failed storage device in a storage system using one or more functioning compute resources and/or storage resources of the failed storage device.

Storage systems with a plurality of storage devices typically employ data redundancy techniques (e.g., redundant array of independent disks (RAID) mirroring or parity, erasure coding) to enable reconstructing data and rebuilding of a failed storage device. However, conventional data reconstruction and rebuild processes for failed storage devices may cause a significant degradation in system performance because the remaining functioning storage devices in the system may need to be used to reconstruct the lost data, which may require significant CPU time as well as bandwidth of the storage system interconnect.

For example, when a storage device in a RAID array has failed, in conventional systems the failed storage device is pushed out of the array and the RAID controller (either standalone or hosted by the host CPU) sends additional commands to the remaining functioning storage devices to reconstruct the lost data of the failed storage device. The reconstruction of the data is typically performed by the RAID controller using exclusive-OR (XOR) or Galois Field (GF) operations.

SUMMARY

The present disclosure relates to methods and systems for reconstructing data and rebuilding a failed storage device in a storage system using one or more functioning compute resources and/or storage resources of the failed storage device.

As discussed above, a problem associated with conventional data reconstruction and rebuild processes for failed storage devices is that they may cause a significant degradation in system performance during data recovery. In view of this, there is a need for an improved method for reconstructing data and rebuilding a failed storage device in a storage system.

Various embodiments of the present disclosure as disclosed herein may reconstruct data and/or rebuild a failed storage device in a storage system using one or more functioning compute resources and/or storage resources of the failed storage device. In at least some embodiments, the failed storage device itself may participate in the failed storage device data reconstruction and/or rebuild process by communicating in a peer-to-peer (P2P) fashion with the remaining functioning storage devices in the storage system. Further, in at least some embodiments, the actual failure mechanism of the failed storage device may be taken into account in performing the device rebuild. For example, in cases where the failed storage device exhibits only a partial media failure, the data reconstruction may be limited to being performed on only the failed portion of the media.

As a consequence of this, one or more embodiments of the present disclosure may provide a number of technical features and advantages, including but not limited to one or more of the following:

(1) Improved system performance during the failed storage device data reconstruction and/or rebuild process through the use of functioning compute resources and/or storage resources of the failed storage device to reconstruct data of the failed storage device.

(2) Improved system performance during the failed storage device data reconstruction and/or rebuild process in cases of a partial loss of data in the failed storage device, by performing the data reconstruction process specifically for the failed portion of the media. In these cases, the degradation of system performance may be proportionate to only the actual amount of data lost rather than to all of the data of the failed storage device.

The present disclosure includes, but is not limited to, the following aspects:

According to one innovative aspect, a method including responsive to a detection of a failed storage device in a storage system, locating data and redundancy information in one or more functioning storage devices in the storage system for reconstructing data of the failed storage device; issuing one or more peer-to-peer commands to the one or more functioning storage devices to obtain the data and the redundancy information from the one or more functioning storage devices; and reconstructing the data of the failed storage device based on the data and the redundancy information obtained from the one or more functioning storage devices, wherein a functioning compute resource of the failed computing device at least partially performs one or more of the locating, issuing, and reconstructing.

According to another innovative aspect, an apparatus including one or more processors; and logic, executable by the one or more processors, configured to perform operations including: responsive to a detection of a failed storage device in a storage system, locating data and redundancy information in one or more functioning storage devices in the storage system for reconstructing data of the failed storage device; issuing one or more peer-to-peer commands to the one or more functioning storage devices to obtain the data and the redundancy information from the one or more functioning storage devices; and reconstructing the data of the failed storage device based on the data and the redundancy information obtained from the one or more functioning storage devices, wherein a functioning compute resource of the failed computing device at least partially performs one or more of the locating, issuing, and reconstructing.

According to yet another innovative aspect, an apparatus including a controller having one or more processors; and a storage array coupled to the controller, the storage array including a plurality of storage devices, wherein the controller and the storage array are configured to perform operations including: detecting, by the controller, a failed storage device in the storage array; locating, by the failed storage device, data and redundancy information in one or more functioning storage devices in the storage array for reconstructing data of the failed storage device; issuing, by the failed storage device, one or more peer-to-peer commands to the one or more functioning storage devices to obtain the data and the redundancy information from the one or more functioning storage devices; reconstructing, by the failed storage device, the data of the failed storage device based on the data and the redundancy information obtained from the one or more functioning storage devices; and writing, by the controller, the reconstructed data of the failed storage device to one or more available locations in the storage array.

These and other implementations may each optionally include one or more of the following features: that the method or operations further include writing the reconstructed data of the failed storage device to one or more available locations in the storage system; that the functioning compute resource of the failed storage device is a device controller; that the one or more peer-to-peer commands includes a read command issued and executed by the failed storage device; that the method further includes defining a stripe in the storage system, the stripe being associated with the data of the failed storage device and the data and the redundancy information in the one or more functioning storage devices; that the method or operations further include identifying a media section of the failed storage device that contains recoverable data, and copying the recoverable data from a first location in the media section of the failed storage device to a second location in the media section of the failed storage device; and that the media section of the failed storage device is a memory cell.

Other implementations of one or more of these aspects include corresponding systems, apparatus, and computer programs, configured to perform the actions of the methods, encoded on computer storage devices. It should be understood that language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods for rebuilding a failed storage device in a storage system using one or more functioning compute resources and/or storage resources of the failed storage device are disclosed. While this technology is described below in the context of a particular system architecture in various cases, it should be understood that the systems and methods can be applied to other architectures and organizations of hardware. More specifically, it should be noted that while the following description is made with reference to certain embodiments, the present disclosure may apply to any storage system that implements data redundancy known or contemplated.

Figure 1:
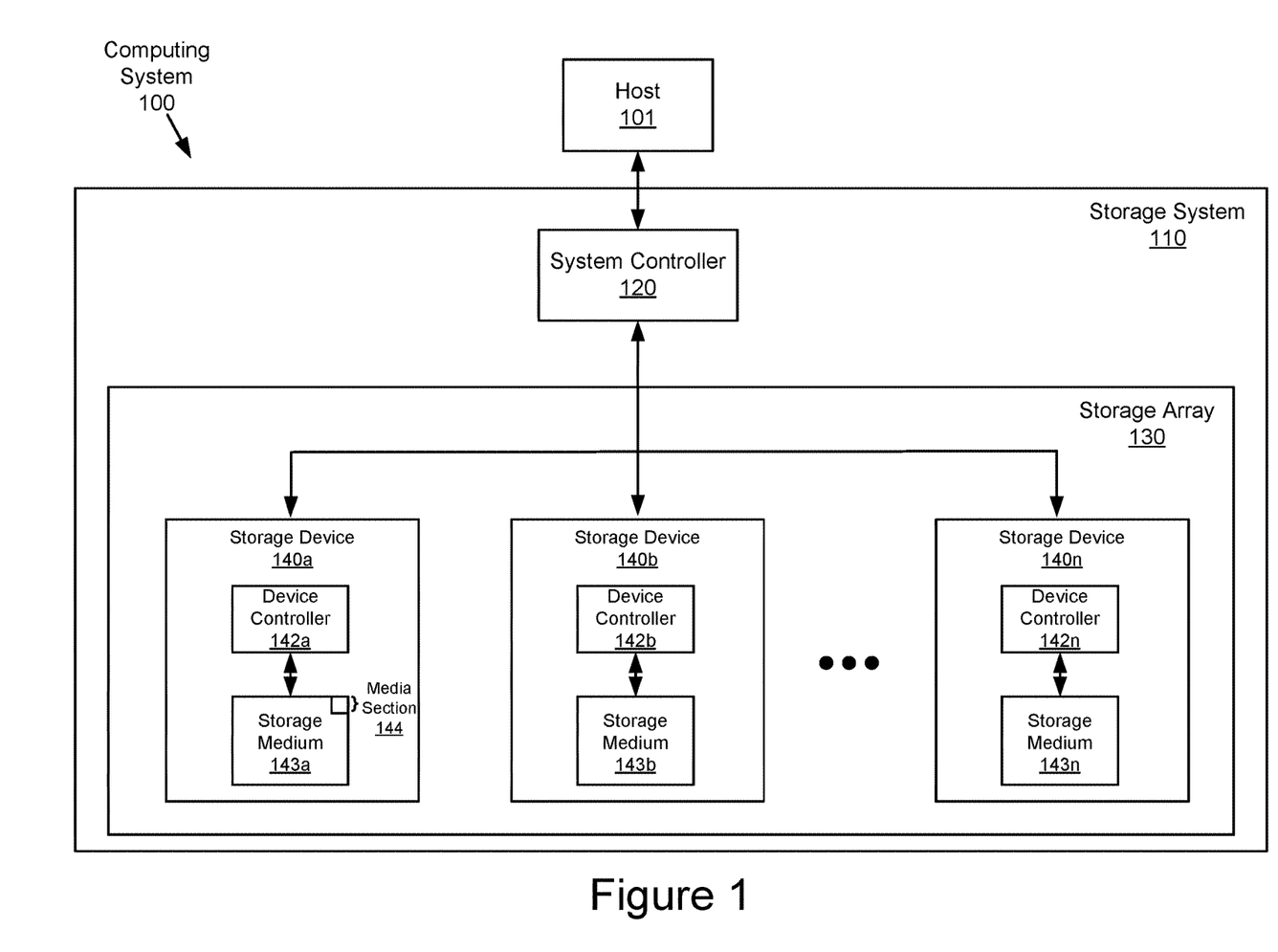
FIG. 1 depicts a block diagram of an example computing system including a host and a storage system, in accordance with an embodiment.

FIG. 1 depicts a block diagram of an example computing system 100 including a host 101 and a storage system 110, in accordance with an embodiment.

The host 101 may be one or more of any suitable computer devices or systems, such as a server computer, a desktop computer, a laptop computer, a tablet computer, a mobile telephone, or any other electronic device capable of making requests to the storage system 110. In some embodiments, the host 101 may include one or more processors, one or more memory devices, and any other suitable components to add functionality to the host 101.

The host 101 may be communicatively coupled to the storage system 110 through a network, such as a local-area network (LAN), wide-area network (WAN), switched fabric, wired or wireless network, private or public network, etc.

The host 101 may execute one or more applications that make storage requests (e.g., read, write, etc.) to the storage system 110. In some embodiments, the one or more applications may be dedicated software applications running on the host 101 or may alternatively reside on other suitable computing devices and may be remotely executed by the host 101.

The storage system 110 may comprise a system controller 120 and a storage array 130 coupled to the system controller through a transport medium, such as an internal fabric based on Ethernet, InfiniBand, PCI Express (PCIe), NVM Express Over Fabric (NVMeOF), etc. As described in more detail with reference to FIG. 2 below, the system controller 120 may comprise one or more computing devices and/or software (collectively referred to as "logic" in the present disclosure) configured to manage the operation of and provide an external interface to (e.g., for communication with the host 101) the storage array 130. For example, the system controller 120 may coordinate and perform various operations on storage devices of the storage array 130 including data redundancy and/or recovery, storage device rebuild, and/or garbage collection. In addition, in some embodiments the system controller 120 may coordinate communications between the host 101 and the storage array 130, including forwarding read or write requests from the host 101 to the corresponding storage device (including performing any necessary address translation as described further below), and retrieving data from the storage devices in a logical manner (e.g., chunks may be assembled into a stripe) before being returned to the host 101. In some embodiments, the system controller 120 may be an NVM Express (NVMe) controller.

In some embodiments, the system controller 120 may coordinate its actions with the actions of the other components in the computer system 100, such as the host 101 and/or the storage array 130, in performing the data construction and/or rebuild process for a failed storage device as described below with reference to FIGS. 4, 5, and 7. The system controller 120 may perform and coordinate these actions in connection with the data reconstruction and/or rebuild process, using, for example, a distributed global flash translation layer (FTL) data management scheme, as described further below with reference to FIG. 8. In some embodiments, the system controller 120 may not be a separate component as shown in FIG. 1 but instead may be integrated into the host 101 or in one or more of the storage devices 140a, 140b, . . . , 140n.

The storage array 130 may comprise a plurality of storage devices 140a, 140b, . . . , 140n (each storage device henceforth to be generally referred to individually as storage device 140), each of which may comprise a volatile or non-volatile non-transitory memory device with suitable characteristics, such as flash memory (e.g., solid-state drive (SSD)), persistent memory (PM), and/or hard disk media including shingled magnetic recording (SMR) disks, hybrid storage devices, etc. The storage devices 140a, 140b, . . . , 140n in the storage array 130 may be communicatively coupled to each other through a transport medium, such as an internal fabric based on Ethernet, InfiniBand, PCIe, NVMeOF, etc.

Each storage device 140 includes a device controller 142 and a storage medium 143. As described in more detail with reference to FIG. 3 below, the device controller 142 may comprise one or more computing devices and/or software (collectively referred to as "logic" in the present disclosure) configured to manage the operation of the storage medium 143 and provide an external interface to the respective storage device 140. In some embodiments, as described below with reference to FIGS. 4, 5 and 7, these operations may include performing peer-to-peer communications (e.g., data transfers) with other storage devices in the storage array 130.

The storage medium 143 may comprise one or more volatile or non-volatile memory media that include one or more media sections 144 comprising physical or logical portions of the storage medium for storing data, such as dies, disks, memory cells, sectors, and/or pages. In some embodiments, data may be organized in the storage medium 143 of each storage device 140 in the form of chunks, of which each chunk may be composed of one or more blocks. Further, the chunks may be written to the storage devices 140a, 140b, . . . , 140n in the storage array 130 in the form of stripes using a suitable data structuring methodology such as log-structuring. This is shown and described in further detail below with reference to FIG. 6.

As discussed below with reference to FIGS. 4, 5, and 7, the storage system 110 may be configured using a suitable redundancy scheme such as RAID or erasure coding such that in the event of a failure of one or more of the storage devices 140a, 140b, . . . , 140n (henceforth to be referred to as failed storage device 140'), a data reconstruction and/or rebuild process as described below may be performed to recover the data from the failed storage device(s).

In the present disclosure, a "failed storage device" may refer to any storage device in the storage array that is not properly functioning in any respect, including: (1) a storage device that is still operational but may be deemed "failed" based on an early warning indication and (2) a storage device that has only partially failed. For example, in some embodiments the failed storage device may include one or more storage resources (e.g., storage medium 143) that have partially or completely failed and one or more compute resources (e.g., device controller 142) that remain at least partially functioning (e.g., able to perform at least some of their intended functions). The one or more storage devices in the storage array other than the failed storage device may be referred to as "functioning storage devices."

Figure 2:
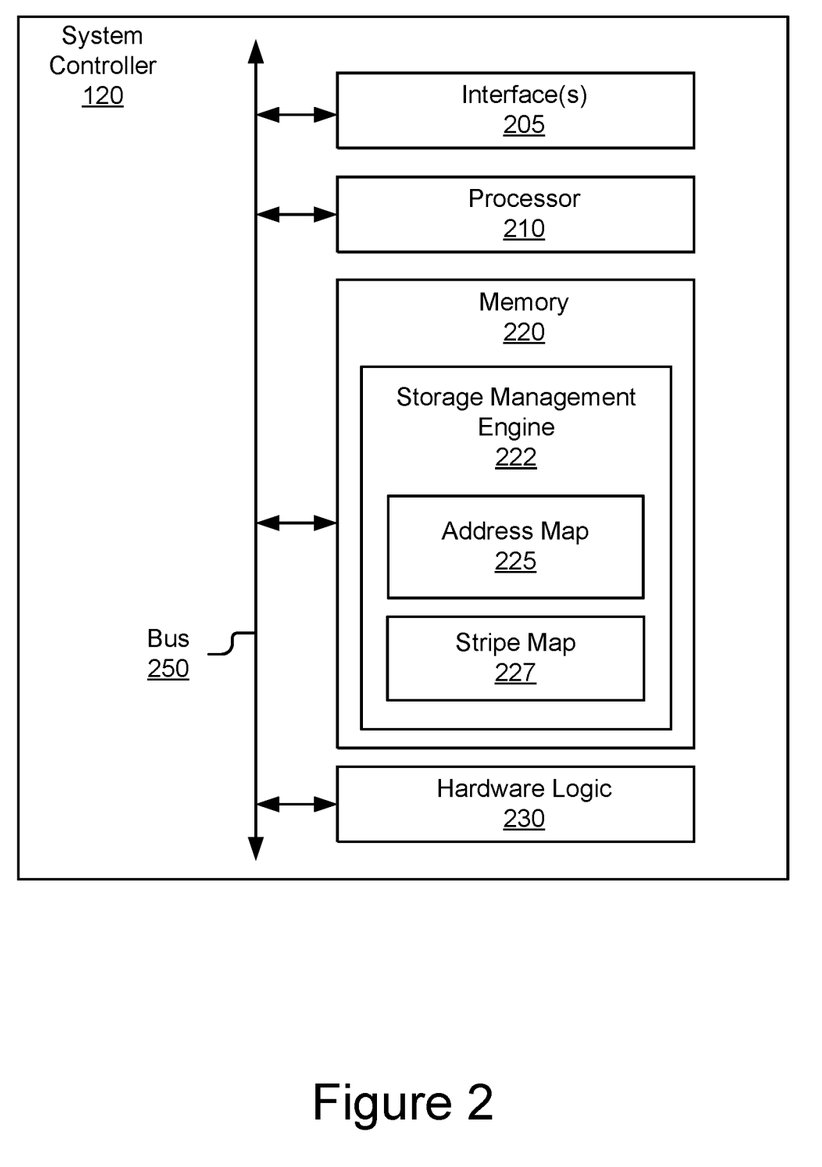
FIG. 2 depicts a block diagram of an example system controller for the storage system shown in FIG. 1, in accordance with an embodiment.

FIG. 2 depicts a block diagram of an example system controller 120 for the storage system 110 shown in FIG. 1, in accordance with an embodiment. As noted earlier, the system controller 120 may be used to manage the operation of and provide an external interface to (e.g., for communication with the host 101) the storage array 130. The system controller 120 may coordinate its actions with the actions of other components in the computer system 100, such as the host 101 and/or the storage array 130, in performing the data reconstruction and/or rebuild process for a failed storage device as described below with reference to FIGS. 4, 5, and 7, using, for example, the distributed global FTL data management scheme as described below with reference to FIG. 8.

As shown in FIG. 2, the system controller 120 may comprise, among other components, one or more interface(s) 205, a processor 210, a memory 220 containing software, firmware and/or data including, but not limited to, a storage management engine 222. A bus 250 may be used to communicatively couple the various components of the system controller 120. It should be understood that the system controller 120 may include alternative, additional and/or fewer components depending on the configuration, such as configurations combining elements, implementing elements in hardware vs. software, etc.

The one or more interface(s) 205 may communicatively couple the system controller 120 to the host 101 and/or the storage array 130. The one or more interface(s) 205 may include, but are not limited to, input/output (I/O) interface circuitry that uses appropriate communications protocol(s) for communicating with the host 101 and/or the storage array 130.

The processor 210, which may include one or more processing units, may be used to execute the instructions of various software programs contained in the memory 220. The processor 210 may include one or more processing units and/or cores, programmable integrated circuits such as application-specific integrated circuits (ASICs) or field-programmable gate arrays (FPGAs), or some combination thereof. The processor 210 may be based on various computing architectures including a complex instruction set computer (CISC) architecture, a reduced instruction set computer (RISC) architecture, or an architecture implementing a combination of instruction sets. It should be understood that other configurations of the processor 210 are possible.

The memory 220, which may include one or more non-transitory storage devices, may store software programs, firmware and/or data that are executed or otherwise processed by the processor 210. The memory 220 may comprise, for example, volatile memory such as dynamic random-access memory (DRAM) device(s), static random-access memory (SRAM) device(s), non-volatile memory such as electrically erasable programmable read-only memory (EEPROM) or flash memory devices, a combination of the foregoing, and/or some other suitable type of data storage medium.

The storage management engine 222 contained in memory 220 may include routines and/or instructions that when executed by the processor 210 may perform one or more of the various memory management operations for the storage array 130, including operations relating to address translation, data recovery and reconstruction, storage device rebuild and/or garbage collection.

In some embodiments, the storage management engine 222 may include an address map 225 that contains address information used by the storage management engine 222 to translate logical addresses or name spaces received in connection with read or write requests received from the host 101 into physical addresses for accessing storage devices in the storage array 130, as described below with reference to FIGS. 4, 5, and 7. In some embodiments, the storage management engine 222 may include a stripe map 227 that is used in connection with the writing or reading of data to a stripe in the storage array 130, as described below with reference to FIG. 7.

In some embodiments, one or more hardware logic module(s) 230, such as ASICs, FPGAs, etc., may be employed in place of, or as a supplement to, the software and/or firmware in the memory 220 to perform one or more of the aforementioned functions provided by the storage management engine 222, address map 225 and/or stripe map 227.

Figure 3:
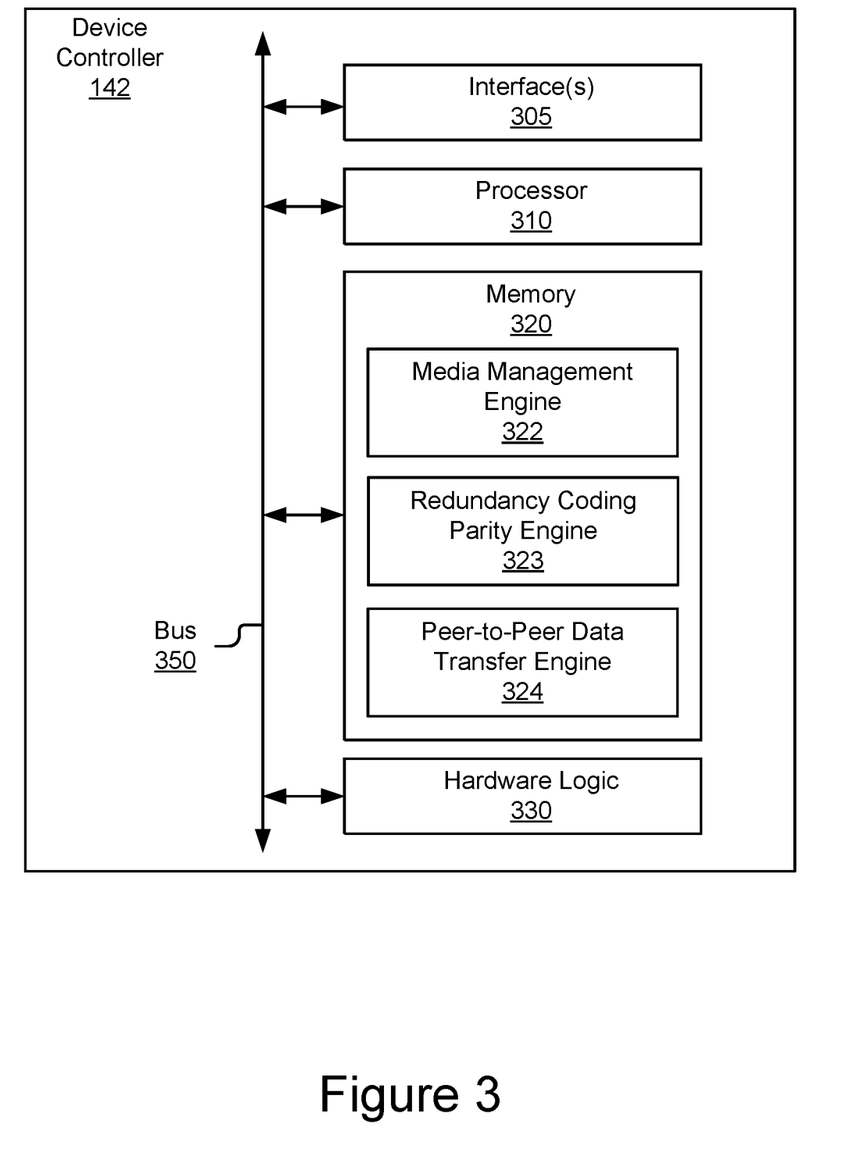
FIG. 3 depicts a block diagram of an example device controller for the storage system shown in FIG. 1, in accordance with an embodiment.

FIG. 3 depicts a block diagram of an example device controller 142 for the storage system 110 shown in FIG. 1, in accordance with an embodiment. As noted earlier, the device controller 142 may be used to manage the operation of and provide an external interface to the respective storage device 140.

As shown in FIG. 3, the device controller 142 may comprise, among other components, one or more interface(s) 305, a processor 310, a memory 320 containing software, firmware and/or data including a media management engine 322, redundancy coding parity engine 323, and a peer-to-peer data transfer engine 324. A bus 350 may be used to communicatively couple the various components of the device controller 142. It should be understood that the device controller 142 may include alternative, additional and/or fewer components depending on the configuration, such as configurations combining elements, implementing elements in hardware vs. software, etc.

The one or more interface(s) 305 may communicatively couple the device controller 142 to the system controller 120 and/or the other storage devices in the storage array 130. The one or more interface(s) 305 may include, but are not limited to, input/output (I/O) interface circuitry that uses appropriate communications protocol(s) for communicating with the system controller 120 and/or the other storage devices.

The processor 310, which may include one or more processing units, may be used to execute the instructions of various software programs contained in the memory 320. The processor 310 may include one or more processing units and/or cores, programmable integrated circuits such as application-specific integrated circuits (ASICs) or field-programmable gate arrays (FPGAs), or some combination thereof. The processor 310 may be based on various computing architectures including a complex instruction set computer (CISC) architecture, a reduced instruction set computer (RISC) architecture, or an architecture implementing a combination of instruction sets. It should be understood that other configurations of the processor 310 are possible.

The memory 320, which may include one or more non-transitory storage devices, may store software programs, firmware and/or data that are executed or otherwise processed by the processor 310. The memory 320 may comprise, for example, volatile memory such as dynamic random-access memory (DRAM) device(s), static random-access memory (SRAM) device(s), non-volatile memory such as electrically erasable programmable read-only (EEPROM) or flash memory devices, a combination of the foregoing, and/or some other suitable type of data storage medium.

The media management engine 322 contained in memory 320 may include routines and/or instructions that when executed by the processor 310 may perform one or more of the various memory management operations for the storage medium 143, including operations relating to data recovery and reconstruction and/or device-level garbage collection.

The redundancy coding parity engine 323 contained in memory 320 may include routines and/or instructions that when executed by the processor 310 may perform one or more data redundancy operations, including generating and storing redundancy information (e.g., parity blocks), for the storage medium 143.

The peer-to-peer data transfer engine 324 contained in memory 320 may include routines and/or instructions that when executed by the processor 310 may perform one or more actions for conducting peer-to-peer communications with other storage devices in the storage array 130, such as issuing and executing peer-to-peer commands and transferring data to or from the other storage devices, as described below with reference to FIGS. 4, 5, and 7. The peer-to-peer data transfer engine 324 can perform the peer-to-peer communications in various ways. For example, in some embodiments, the peer-to-peer data transfer engine 324 may operate in full initiator mode, which enables a storage device to connect, to create commands, and to send the commands to other storage devices. In some other embodiments, the host 101 may set up shared memory areas in each storage device 140, send one or more commands to a source storage device to read data in the source storage device to a shared memory area, and then initiate the sending of data from the shared memory area to a target storage device using direct memory access (DMA).

In some embodiments, one or more hardware logic module(s) 330, such as ASICs, FPGAs, etc., may be employed in place of, or as a supplement to, the software and/or firmware in the memory 320 to perform one or more of the aforementioned functions provided by the media management engine 322, redundancy coding parity engine 323 and/or peer-to-peer data transfer engine 324.

Figure 4:
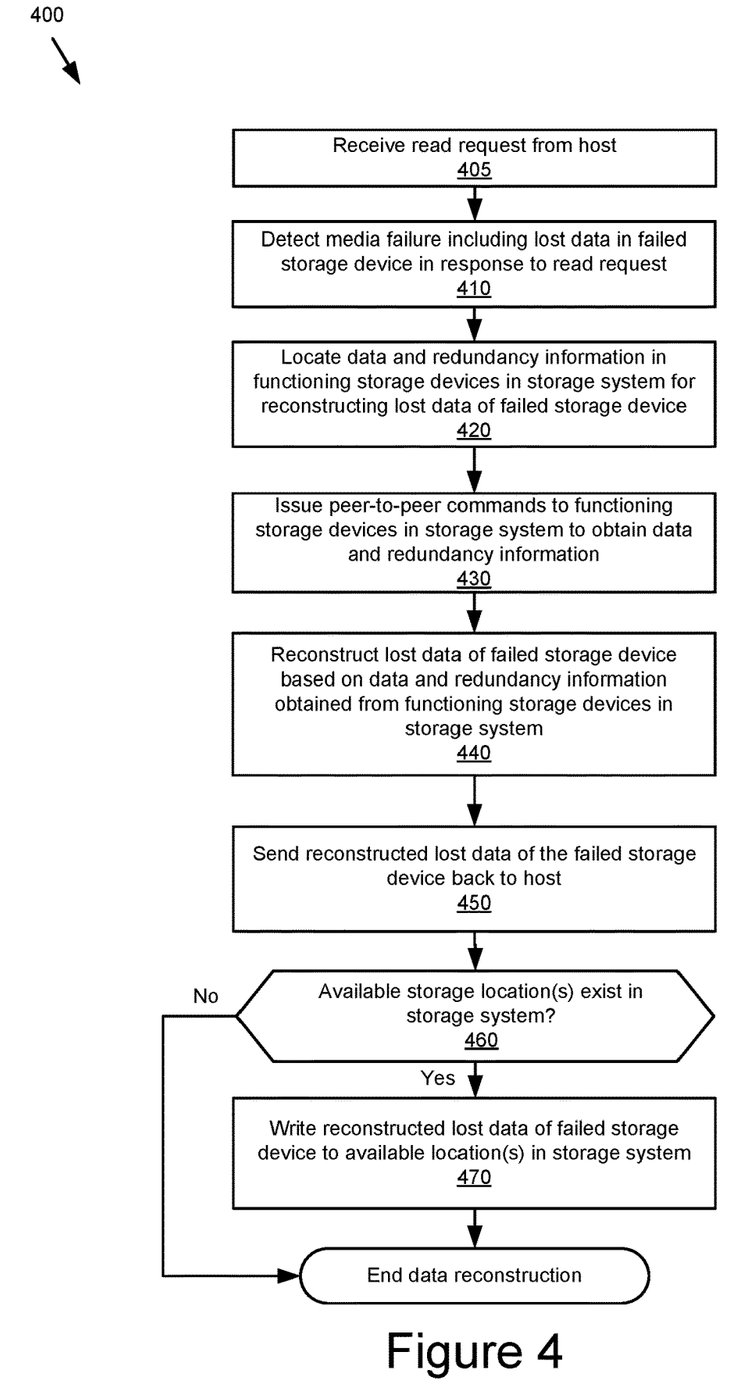
FIG. 4 depicts a flow diagram of an example method for reconstructing data of a failed storage device using one or more functioning compute resources and/or storage resources of the failed storage device via peer-to-peer communications for the storage system shown in FIG. 1, in accordance with an embodiment.

FIG. 4 depicts a flow diagram of an example method 400 for reconstructing data of a failed storage device 140' using one or more functioning compute resources and/or storage resources of the failed storage device via peer-to-peer communications (e.g., data transfers) for the storage system 110 shown in FIG. 1, in accordance with an embodiment. The data reconstruction method of FIG. 4 may be performed, for example, in the case of a partial media failure of a storage device 140. It should be noted that in this example, blocks 430 and 440 may be performed, at least in part, by a functioning compute resource (e.g., device controller 142) of the failed storage device 140'. The remaining blocks shown in FIG. 4 may be performed by one or more of a storage device 140 (including the failed storage device 140') in the storage system 110, the system controller 120, and the host 101, or some combination thereof, for example, in accordance with the distributed global FTL data management scheme as described below with reference to FIG. 8.

In block 405, a read request or other command may be received from the host 101. Block 405 may occur during the normal operation of the storage system 110.

In block 410, a media failure including lost data may be detected in the failed storage device 140' in response to receiving the read request. In the present disclosure, lost data may be considered as data that cannot be properly read from the storage device due to a failure of one or more media sections 144 of the storage medium 143 and conversely, recoverable data may be considered as data that can be properly read from the storage device.

In some embodiments, in the case of a partial media failure, block 410 may include identifying a media section 144 of the storage medium 143 in the failed storage device 140' that has failed (henceforth referred to as failed media section 144') that contains the lost data, and a media section of the failed storage device that has not failed (henceforth referred to as functioning media section 144") that contains recoverable data. In some embodiments, each media section 144 may comprise one or more physical or logical portions of the storage medium 143 in the respective storage device 140 for storing data, such as dies, disks, memory cells, sectors, and/or pages.

In block 420, data and redundancy information may be located in one or more of the storage devices 140a, 140b, ..., 140n in the storage system 110 that have not failed (henceforth referred to as functioning storage devices 140") for reconstructing the lost data of the failed storage device 140'. In some embodiments, the data and the redundancy information may be located in the one or more functioning storage devices 140" using the distributed global FTL data management scheme as described below with reference to FIG. 8.

In block 430, the failed storage device 140' in the storage system 110 may issue one or more peer-to-peer commands to the one or more functioning storage devices 140" in the storage system 110 to obtain the data and the redundancy information from the functioning storage device(s). In some embodiments, the peer-to-peer command may be a read command. In some embodiments, the peer-to-peer command may be issued and executed by the peer-to-peer data transfer engine 324 in the device controller 142 of the respective storage device.

In block 440, the failed storage device 140' in the storage system 110 may reconstruct the lost data of the failed storage device 140' based on the data and the redundancy information obtained from the one or more functioning storage devices 140" in storage system 110. In some embodiments, the lost data of the failed storage device may be reconstructed by the media management engine 322 in the device controller 142, as described above with reference to FIG. 3, of the storage device. In some embodiments, the lost data may be reconstructed by performing one or more XOR or GF operations as appropriate on the data and the redundancy information, as is known in the art.

In block 450, the reconstructed lost data of the failed storage device 140' may be sent back to the host 101, e.g., in response to the read request from the host. In some embodiments, block 450 may be performed in accordance with the distributed global FTL data management scheme as described below with reference to FIG. 8.

In block 460, an existence of one or more available storage locations in the storage system 110 may be determined. If an available storage location is determined to exist, the method may proceed to block 470. If not, the data reconstruction may end at that point since an available storage location for storing the reconstructed lost data does not exist. In some embodiments, the available location(s) may be available spare space located in the storage array 630.

In block 470, the reconstructed lost data of the failed storage device 140' may be written to the one or more available storage locations in the storage system 110 identified in block 460. In some embodiments, the available locations to which the reconstructed lost data is written may be located in the failed storage device 140' and/or the functioning storage devices 140" in the storage system 110. In some embodiments, block 470 may be performed in accordance with the distributed global FTL data management scheme as described below with reference to FIG. 8.

In some embodiments, in the case of a partial media failure, block 470 may include copying the recoverable data identified in block 410 from a first location in the functioning media section 144" of the failed storage device 140' to a second location in the functioning media section of the failed storage device. In some embodiments, the copying may be performed by the failed storage device issuing an XCOPY command.

Figure 5:
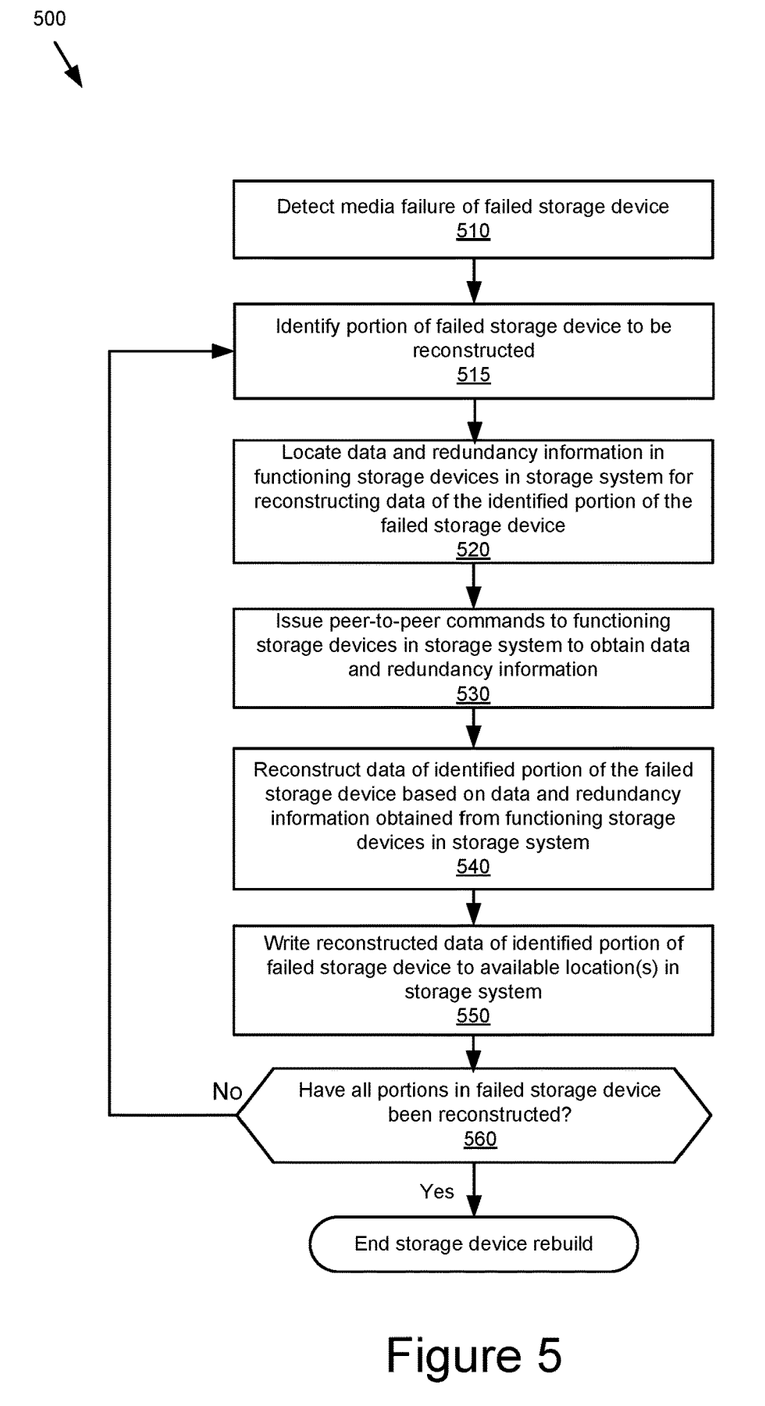
FIG. 5 depicts a flow diagram of an example method for rebuilding a failed storage device using one or more functioning compute resources and/or storage resources of the failed storage device via peer-to-peer communications for the storage system shown in FIG. 1, in accordance with an embodiment.

FIG. 5 depicts a flow diagram of an example method 500 for rebuilding a failed storage device 140' using one or more functioning compute resources and/or storage resources of the failed storage device via peer-to-peer communications for the storage system 110 shown in FIG. 1, in accordance with an embodiment. The blocks in the method 500 may be iteratively performed, for example, for each stripe in the storage array 130, until the contents of the failed storage device 140' have been rebuilt. It should be noted that in this example, blocks 530 and 540 may be performed, at least in part, by a functioning compute resource (e.g., device controller 142) of the failed storage device 140'. The remaining blocks shown in FIG. 5 may be performed by one or more of a storage device 140 (including the failed storage device 140') in the storage system 110, the system controller 120, and the host 101, or some combination thereof, for example, in accordance with the distributed global FTL data management scheme as described below with reference to FIG. 8.

In block 510, a media failure may be detected in the failed storage device 140'. In some embodiments, block 510 may be performed in response to a read request or other command received from the system controller 120 during the normal operation of the storage system 110.

In block 515, a portion (e.g., one or more blocks of a stripe in the storage array 130) of the failed storage device 140', to be reconstructed may be identified.

In block 520, data and redundancy information may be located in one or more of the functioning storage devices 140" in the storage system 110 for reconstructing data of the identified portion of the failed storage device 140'.

In block 530, the failed storage device 140' in the storage system 110 may issue one or more peer-to-peer commands to the one or more functioning storage devices 140" in the storage system 110 to obtain the data and the redundancy information from the functioning storage device(s). In some embodiments, the peer-to-peer command may be a read command. In some embodiments, the peer-to-peer command may be issued and executed by the peer-to-peer data transfer engine 324 in the device controller 142 of the respective storage device.

In block 540, the failed storage device 140' in the storage system 110 may reconstruct the data of the identified portion of the failed storage device 140' based on the data and the redundancy information obtained from the one or more functioning storage devices 140" in storage system 110. In some embodiments, the lost data of the failed storage device may be reconstructed by the media management engine 322 in the device controller 142, as described above with reference to FIG. 3, of the storage device. In some embodiments, the lost data may be reconstructed by performing one or more XOR or GF operations as appropriate on the data and the redundancy information, as is known in the art.

In block 550, the reconstructed data of the identified portion of the failed storage device 140' may be written to one or more available storage location(s) in the storage system 110. In some embodiments, the available locations to which the reconstructed lost data is written may be located in the failed storage device 140' and/or the functioning storage devices 140" in the storage system 110.

In block 560, it is determined if all portions of the failed storage device 140' have been reconstructed. If this is the case, the rebuild process is completed and may end. However, if this is not the case, block 515 through block 550 may be iteratively repeated as just described for the remaining portions of the failed storage device 140' until the contents of the failed storage device have been rebuilt.

Figure 6:
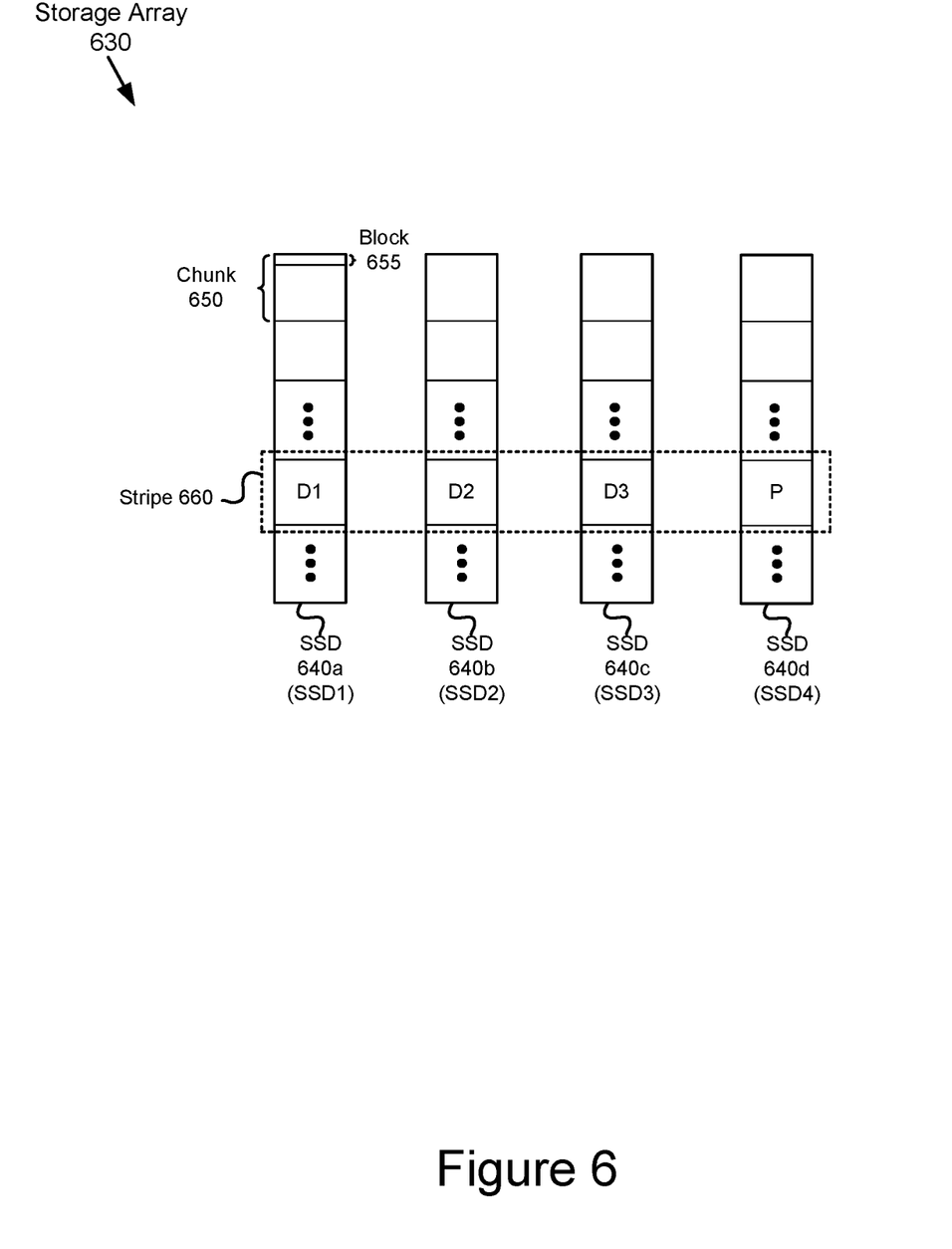
FIG. 6 depicts a block diagram of an example storage array for the storage system shown in FIG. 1, in accordance with an embodiment.

FIG. 6 depicts a block diagram of an example storage array 630 for the storage system 110 shown in FIG. 1, in accordance with an embodiment. The storage array 630 is an embodiment of the storage array 130 shown in FIG. 1 including four solid-state drives (SSDs) 640a, 640b, 640c, and 640d (also referred to henceforth as SSD1, SSD2, SSD3, and SSD4, respectively) in a 3+1 configuration. Although the storage system 110 is shown in FIG. 6 with four SSDs for ease of illustration, it should be noted that in other embodiments the storage system may employ other types of storage devices, such as hard disk media or hybrid storage devices, in any suitable quantity.

As shown in the figure, each of SSD1, SSD2, SSD3, and SSD4 in the storage array 630 may contain a plurality of chunks 650, of which chunk may include one or more blocks 655. The plurality of chunks 650 contained in the storage array 630 may be organized into one or more stripes 660.

The stripe 660 may comprise a combination of one or more data chunks and one or more error-correction (e.g., parity) chunks as appropriate for the data redundancy scheme used in the storage array 630. As shown in FIG. 6, the stripe 660 includes four chunks 650, of which three chunks contain data (indicated with "D1", "D2", and "D3") and one chunk contains parity information (indicated with a "P"). The data D1, D2, and D3 may be written to the stripe 660 using a suitable data structuring methodology such as log-structuring. In a log-structured data organization, random writes of data may be grouped together and written sequentially to the stripe 660.

In the method for rebuilding a failed storage device to be described below with reference to FIG. 7, SSD2 corresponds to the "failed storage device" and SSD1, SSD3, and SSD4 correspond to the "functioning storage devices".

Figure 7:
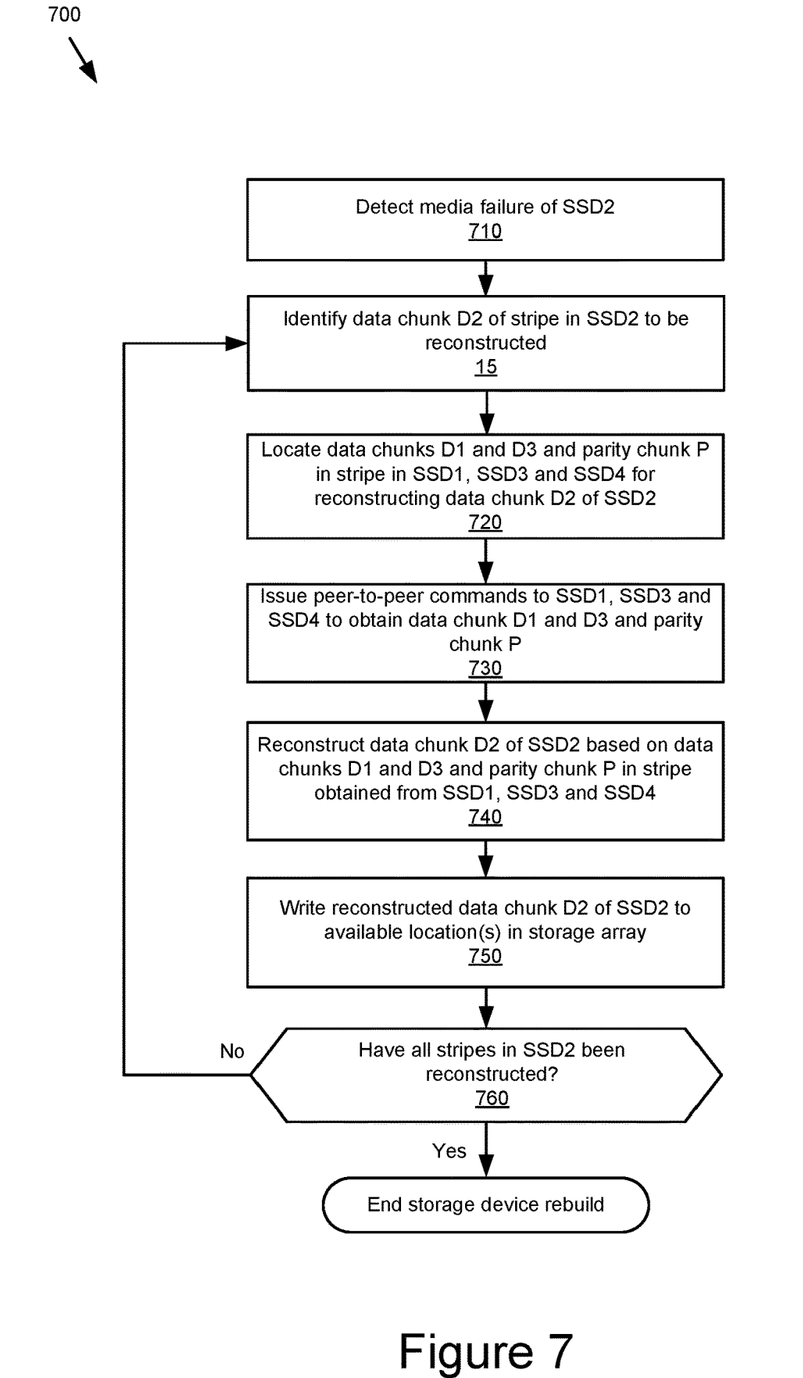
FIG. 7 depicts a flow diagram of an example method for rebuilding a failed storage device using one or more functioning compute resources and/or storage resources of the failed storage device via peer-to-peer communications for the storage array shown in FIG. 6, in accordance with an embodiment.

FIG. 7 depicts a flow diagram of an example method 700 for rebuilding the failed storage device SSD2 using one or more functioning compute resources and/or storage resources of the failed storage device via peer-to-peer communications for the storage array 630 shown in FIG. 6, in accordance with an embodiment. It should be noted that the method illustrated in FIG. 7 corresponds to the method described above with reference to FIG. 5 as applied to the storage array 630. The blocks in the method 700 may be iteratively performed, for example, for each stripe in the storage array 630, until the contents of the failed storage device SSD2 have been rebuilt. It should be noted that in this example, blocks 730 and 740 may be performed, at least in part, by a functioning compute resource (e.g., device controller 142) of the failed storage device SSD2. The remaining blocks in FIG. 7 may be performed by one or more of an SSD (including the failed storage device SSD2) in the storage array 630, the system controller 120 and the host 101, or some combination thereof, for example, in accordance with the distributed global FTL data management scheme as described below with reference to FIG. 8.

In the method shown in FIG. 7, the failed storage device SSD2 may be considered the initiator device and the functioning storage devices SSD1, SSD3, and SSD4 may be considered the target devices.

In block 710, a media failure may be detected in the failed storage device SSD2. In some embodiments, block 710 may be performed in response to a read request from the system controller 120 during the normal operation of the storage system 110.

In block 715, a data chunk D2 of the stripe 660 in the SSD2 to be reconstructed may be identified.

In block 720, the data chunks D1 and D3 and the parity chunk P in the stripe 660 may be located in functioning storage devices SSD1, SSD3, and SSD4, respectively, for reconstructing the data chunk D2 of SSD2.

In block 730, SSD2 may issue one or more peer-to-peer commands to one or more of SSD1, SSD3, and SSD4 to obtain the data chunks D1 and D3 and the parity chunk P in the stripe 660. In some embodiments, the peer-to-peer command may be a read command. In some embodiments, the peer-to-peer command may be issued and executed by the peer-to-peer data transfer engine 324 in the device controller 142 of SSD2.

In block 740, SSD2 may reconstruct the data chunk D2 of SSD2 based on the data chunks D1 and D3 and the parity chunk P obtained from SSD1, SSD3, and SSD4, respectively. In some embodiments, the data chunk D2 may be reconstructed by the media management engine 322 in the device controller 142, as described above with reference to FIG. 3, of SSD2. In some embodiments, the data chunk D2 may be reconstructed by performing one or more XOR or GF operations as appropriate on the data chunks D1 and D3 and the parity chunk P, as is known in the art.

In block 750, the reconstructed data chunk D2 of SSD2 may be written to one or more available storage locations in the storage array 630. In some embodiments, the available location(s) to which the reconstructed data chunk D2 is written may be located in the failed storage device SSD2 and/or the functioning storage devices SSD1, SSD3, and SSD4.

In block 760, it is determined if all portions of the failed storage device SSD2 have been reconstructed. If this is the case, the rebuild process is completed and may end. However, if this is not the case, block 715 through block 750 may be iteratively repeated as just described for the remaining portions of SSD2 until the contents of SSD2 have been rebuilt.

Figure 8:
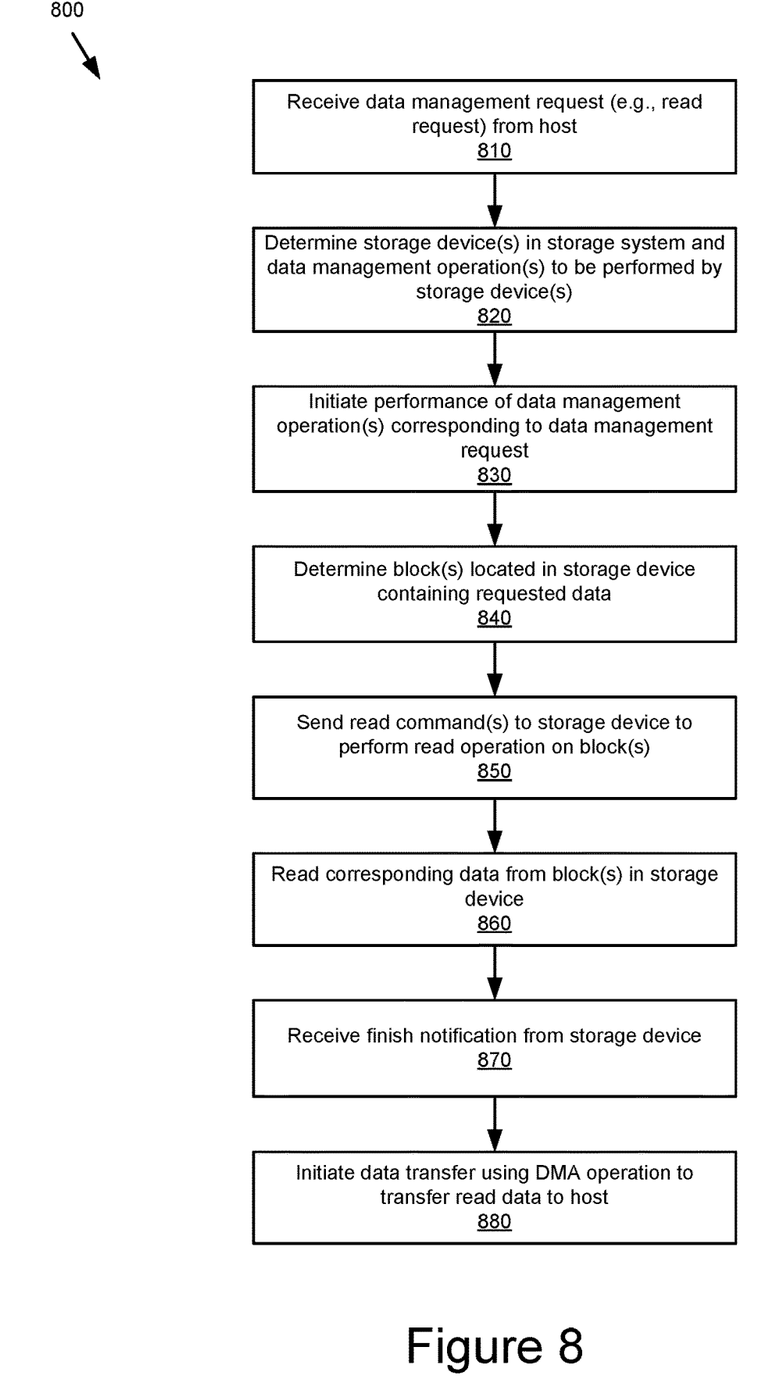
FIG. 8 depicts a flow diagram of an example method for performing a data management request (e.g., read request) in accordance with a distributed global flash translation layer (FTL) data management scheme for the computing system shown in FIG. 1, in accordance with an embodiment.

FIG. 8 depicts a flow diagram of an example method 800 for performing a data management request (e.g., read request) in accordance with a distributed global flash translation layer (FTL) data management scheme for the computing system 100 shown in FIG. 1, in accordance with an embodiment. In the example shown in FIG. 8, most of the blocks in the method 800 are performed by the system controller 120, although in other embodiments one or more of the blocks in the method may be performed by other devices (e.g., host 101 or storage device 140) in the storage system 110.

In block 810, the system controller 120 may receive a data management request (e.g., read request) from the host 101.

In block 820, the system controller 120 may determine (e.g., using the storage management engine 222), based on the data management request, one or more storage devices 140 in the storage system 110 and one or more data management operations to be performed by the one or more storage devices 140. In some embodiments, the system controller 120, in order to determine the one or more storage devices 140, receives an input logical address from the host 101 and indexes the address map 225, which maps logical addresses to storage devices, using the input logical address to identify the one or more storage devices 140. In some such embodiments, the system controller 120 uses at least a portion of the input logical address to identify the one or more storage devices 140.

In block 830, the system controller 120 may initiate performance of data management operation(s) corresponding to the data management request. In some embodiments, block 830 includes sending one or more data management commands to the one or more storage devices 140 and initiating one or more data transfers (either before or after sending the one or more data management commands). The one or more data transfers may include one or more operations such as a direct memory access (DMA) operation to transfer data between a memory buffer of a respective storage device 140 in the storage system 110 and a memory buffer of the host 101, and/or an internal data transfer between two or more of the storage devices 140 in the storage system 110. In some embodiments, the one or more data transfers includes a DMA operation to transfer data between a memory buffer of a respective storage device 140 in the storage system 110 and a memory buffer of the host 101, and/or an internal data transfer between two or more of the storage devices 140 in the storage system 110.

In block 840, in the case of a read request the system controller 120 determines, based on the address map 225, a set of blocks located in a respective storage device 140 in the storage system 110 containing the requested data. In some embodiments, the address map 225 maps one or more global logical addresses, identified by the read request (received from the host 101), to one or more storage devices 140 in the storage array 130, and optionally to one or more local logical addresses in each such storage device. The local logical addresses are mapped, by the respective storage device 140, to physical addresses in the storage device using logical-to-physical mapping mechanisms in the storage device. In some embodiments, the system controller 120 initiates the computation of the address map 225. In some embodiments, the address map is computed by one or more devices external to the system controller 120. In some embodiments, the address map 225 is stored/located in the respective storage device 140.

In block 850, the system controller 120 sends one or more read commands to the respective storage device 140 to perform the read operation on the set of blocks. In some embodiments, the system controller 120 translates the read request received from the host 101 into the one or more read commands, using a predefined command translation process.

In block 860, the device controller 142 of the respective storage device 140 responds to the one or more read commands by reading the corresponding data from the set of blocks in the respective storage device.

In block 870, the system controller 120 receives a finish notification from the respective storage device 140 that indicates the execution of the read command sent to the respective storage device is complete, and that the resulting read data is stored in a memory buffer of the device controller 142 of the respective storage device.

In block 880, the system controller 120, after receiving the finish notification, initiates a data transfer using a DMA operation to transfer (e.g., send) the read data to the host 101 that sent the read request. In some embodiments, block 880 includes the system controller 120 sending a data transfer command to a respective network interface controller (not shown) in the storage system 110 to transfer the read data from a memory buffer of the system controller 120 to a memory buffer of the host 101, using DMA or remote direct memory access (RDMA) to transfer the read data.

Advantages of one or embodiments of the methods of reconstructing data and rebuilding a failed storage device in a storage system using one or more functioning compute resources and/or storage resources of the failed storage device as described above include but are not limited to one or more of the following:

(1) Improved system performance during (and shortened time required to complete) the failed storage device data reconstruction and/or rebuild process through the use of functioning compute resources and/or storage resources of the failed storage device to reconstruct data of the failed storage device. This takes advantage of the fact that the device controller of the failed storage device may be idle after media failure.

(2) Improved system performance during (and shortened time required to complete) the failed storage device data reconstruction and/or rebuild process by taking into account the actual failure mechanism of the failed storage device. For example, in cases of a partial loss of data in the failed storage device, the data reconstruction process is performed specifically for the failed portion of the media. Thus, in these cases the degradation of system performance may be proportionate to only the actual amount of data lost rather than to all of the data of the failed storage device.

Methods and systems for reconstructing data and rebuilding a failed storage device in a storage system using one or more functioning compute resources and/or storage resources of the failed storage device are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method, comprising:
responsive to a detection of a failed storage device in a storage system, locating data and redundancy information in one or more functioning storage devices in the storage system for reconstructing data of the failed storage device;
issuing one or more peer-to-peer commands to the one or more functioning storage devices to obtain the data and the redundancy information from the one or more functioning storage devices; and
reconstructing the data of the failed storage device based on the data and the redundancy information obtained from the one or more functioning storage devices,
wherein a functioning compute resource of the failed storage device at least partially performs one or more of the locating, issuing, and reconstructing.

2. The computer-implemented method of claim 1, further comprising:
writing the reconstructed data of the failed storage device to one or more available locations in the storage system.

3. The computer-implemented method of claim 1, wherein the functioning compute resource of the failed storage device is a device controller.

4. The computer-implemented method of claim 1, wherein the one or more peer-to-peer commands includes a read command issued and executed by the failed storage device.

5. The computer-implemented method of claim 1, further comprising:
defining a stripe in the storage system, wherein the stripe is associated with the data of the failed storage device and the data and the redundancy information in the one or more functioning storage devices.

6. The computer-implemented method of claim 1, further comprising:
identifying a media section of the failed storage device that contains recoverable data; and
copying the recoverable data from a first location in the media section of the failed storage device to a second location in the media section of the failed storage device.

7. The computer-implemented method of claim 6, wherein the media section of the failed storage device is a memory cell.

8. An apparatus, comprising:
one or more processors; and
logic, executable by the one or more processors, configured to perform operations comprising:
responsive to a detection of a failed storage device in a storage system, locating data and redundancy information in one or more functioning storage devices in the storage system for reconstructing data of the failed storage device;
issuing one or more peer-to-peer commands to the one or more functioning storage devices to obtain the data and the redundancy information from the one or more functioning storage devices; and
reconstructing the data of the failed storage device based on the data and the redundancy information obtained from the one or more functioning storage devices,
wherein a functioning compute resource of the failed storage device at least partially performs one or more of the locating, issuing, and reconstructing.

9. The apparatus of claim 8, wherein the logic is configured to perform operations further comprising:
writing the reconstructed data of the failed storage device to one or more available locations in the storage system.

10. The apparatus of claim 8, wherein the functioning compute resource of the failed storage device is a device controller.

11. The apparatus of claim 8, wherein the one or more peer-to-peer commands includes a read command issued and executed by the failed storage device.

12. The apparatus of claim 8, wherein the logic is configured to perform operations further comprising:
defining a stripe in the storage system, wherein the stripe is associated with the data of the failed storage device and the data and the redundancy information in the one or more functioning storage devices.

13. The apparatus of claim 8, wherein the logic is configured to perform operations further comprising:
identifying a media section of the failed storage device that contains recoverable data; and
copying the recoverable data from a first location in the media section of the failed storage device to a second location in the media section of the failed storage device.

14. The apparatus of claim 13, wherein the media section of the failed storage device is a memory cell.

15. An apparatus, comprising:
a controller including one or more processors;
a storage array coupled to the controller, the storage array including a plurality of storage devices;
means for detecting, by the controller, a failed storage device in the storage array;
means for locating, by the failed storage device, data and redundancy information in one or more functioning storage devices in the storage array for reconstructing data of the failed storage device;
means for issuing, by the failed storage device, one or more peer-to-peer commands to the one or more functioning storage devices to obtain the data and the redundancy information from the one or more functioning storage devices;
means for reconstructing, by the failed storage device, the data of the failed storage device based on the data and the redundancy information obtained from the one or more functioning storage devices; and
means for writing, by the controller, the reconstructed data of the failed storage device to one or more available locations in the storage array.

16. The apparatus of claim 15, wherein a device controller of the failed storage device at least partially performs one or more of the locating, issuing, and reconstructing.

17. The apparatus of claim 15, wherein the one or more peer-to-peer commands includes a read command issued and executed by the failed storage device.

18. The apparatus of claim 15, further comprising:
means for defining a stripe in the storage array, wherein the stripe is associated with the data of the failed storage device and the data and the redundancy information in the one or more functioning storage devices.

19. The apparatus of claim 15, further comprising:
means for identifying a media section of the failed storage device that contains recoverable data; and
means for copying the recoverable data from a first location in the media section of the failed storage device to a second location in the media section of the failed storage device.

20. The apparatus of claim 19, wherein the media section of the failed storage device is a memory cell.

* * * * *